(12) United States Patent
Frysz et al.

(10) Patent No.: US 7,564,674 B2
(45) Date of Patent: Jul. 21, 2009

(54) FEEDTHROUGH FILTER CAPACITOR ASSEMBLIES HAVING LOW COST TERMINAL PINS

(75) Inventors: Christine A. Frysz, Orchard Park, NY (US); Steven Winn, Lancaster, NY (US)

(73) Assignee: Greatbatch Ltd., Clarence, NY (US)

( * ) Notice: Subject to any disclaimer, the term of this patent is extended or adjusted under 35 U.S.C. 154(b) by 220 days.

(21) Appl. No.: 11/609,486

(22) Filed: Dec. 12, 2006

(65) Prior Publication Data

US 2007/0134985 A1    Jun. 14, 2007

Related U.S. Application Data

(60) Provisional application No. 60/749,456, filed on Dec. 12, 2005.

(51) Int. Cl.
*H01G 4/35* (2006.01)

(52) U.S. Cl. .................. 361/302; 361/303; 361/305; 361/306.1; 361/301.2; 361/308.1

(58) Field of Classification Search .......... 361/302, 361/303–306, 307, 306.1, 306.3, 308.1; 333/182–185
See application file for complete search history.

(56) References Cited

U.S. PATENT DOCUMENTS

| | | | |
|---|---|---|---|
| 3,640,705 A | 2/1972 | Selman et al. | |
| 3,829,969 A | 8/1974 | Fischbein et al. | |
| 4,385,029 A | 5/1983 | Desai | |
| 4,468,370 A | 8/1984 | Masumoto et al. | |
| 4,517,156 A | 5/1985 | Masumoto et al. | |
| 4,579,787 A | 4/1986 | Heidsiek et al. | |
| 4,678,868 A | 7/1987 | Kraska et al. | |
| 5,139,891 A | 8/1992 | Cowie et al. | |
| 5,174,954 A | 12/1992 | Schaffer et al. | |
| 5,290,371 A | 3/1994 | Cameron et al. | |
| 5,298,218 A | 3/1994 | Groll et al. | |
| 5,338,509 A | 8/1994 | Coupland et al. | |
| 5,431,875 A | 7/1995 | Cameron et al. | |
| 5,531,003 A * | 7/1996 | Seifried et al. | 29/25.42 |
| 5,538,685 A | 7/1996 | Toyofuku et al. | |
| 5,637,274 A | 6/1997 | Kitamura | |
| 5,867,361 A | 2/1999 | Wolf et al. | |
| 6,008,980 A * | 12/1999 | Stevenson et al. | 361/302 |
| 6,031,710 A * | 2/2000 | Wolf et al. | 361/302 |
| 6,248,190 B1 | 6/2001 | Stinson | |
| 6,290,501 B1 | 9/2001 | Grau et al. | |
| 6,490,148 B1 * | 12/2002 | Allen et al. | 361/302 |
| 6,765,780 B2 * | 7/2004 | Brendel et al. | 361/302 |
| 7,145,076 B2 * | 12/2006 | Knappen et al. | 174/50.6 |
| 2003/0050549 A1 | 3/2003 | Sochor | |
| 2005/0060003 A1 | 3/2005 | Taylor et al. | |
| 2005/0222647 A1 | 10/2005 | Wahlstrand et al. | |
| 2005/0247379 A1 | 11/2005 | Klein et al. | |

OTHER PUBLICATIONS

European Search Report, dated Feb. 13, 2009.

* cited by examiner

*Primary Examiner*—Nguyen T Ha
(74) *Attorney, Agent, or Firm*—Michael F. Scalise

(57) ABSTRACT

Terminal pins comprising an outer coating of palladium coating a core material other than of palladium for incorporated into feedthrough filter capacitor assemblies are described. The feedthrough filter capacitor assemblies are particularly useful for incorporation into implantable medical devices such as cardiac pacemakers, cardioverter defibrillators, and the like, to decouple and shield internal electronic components of the medical device from undesirable electromagnetic interference (EMI) signals.

24 Claims, 2 Drawing Sheets

FEEDTHROUGH FILTER CAPACITOR ASSEMBLIES HAVING LOW COST TERMINAL PINS

CROSS-REFERENCE TO RELATED APPLICATION

This application claims priority from provisional application Ser. No. 60/749,456, filed Dec. 12, 2005.

BACKGROUND OF THE INVENTION

1. Field of the Invention

This invention relates generally to a hermetic feedthrough terminal pin assembly, preferably of the type incorporating a filter capacitor. More specifically, this invention relates to terminal pins comprising palladium or palladium alloys for incorporated into feedthrough filter capacitor assemblies, particularly of the type used in implantable medical devices such as cardiac pacemakers, cardioverter defibrillators, and the like, to decouple and shield internal electronic components of the medical device from undesirable electromagnetic interference (EMI) signals. The terminal pin feedthrough assembly provides a hermetic seal that prevents passage or leakage of fluids into the medical device.

2. Prior Art

Feedthrough assemblies are generally well known in the art for use in connecting electrical signals through the housing or case of an electronic instrument. For example, in an implantable medical device, such as a cardiac pacemaker, defibrillator, or neurostimulator, the feedthrough assembly comprises one or more conductive terminal pins supported by an insulator structure for passage of electrical signals from the exterior to the interior of the medical device. The conductive terminals are fixed into place using a gold brazing process, which provides a hermetic seal between the pin and insulative material. Conventionally, the terminal pins have been composed of platinum or a combination of platinum and iridium. Platinum and platinum-iridium alloys are biocompatible and have good mechanical strength, which adds to the durability of the feedthrough. However platinum is a precious metal that creates a manufacturing cost barrier.

The replacement of platinum and platinum alloys by palladium and its alloys offers several advantages. First, platinum has a density of 21.45 grams/cc. Palladium has a density of 12.02 grams/cc. These materials are priced by weight, but used by volume, which means that palladium has a significant cost advantage over platinum. Secondly, platinum and palladium have nearly equivalent mechanical properties. After high temperature brazing, there is no significant degradation in the mechanical properties of palladium, such as in strength and elongation, in comparison to platinum. Palladium also has comparable soldering and welding characteristics, and it has good radiopacity. Finally, previous research indicates that palladium is biocompatible under both soft tissue and bone studies. Palladium and additive materials that are typically combined with it to form alloys are regarded as chemically inactive.

SUMMARY OF THE INVENTION

In a preferred form, a feedthrough filter capacitor assembly according to the present invention comprises an outer ferrule hermetically sealed to either an alumina insulator or fused glass dielectric material seated within the ferrule. The insulative material is also hermetically sealed to at least one terminal pin. That way, the feedthrough assembly prevents leakage of fluid, such as body fluid in a human implant application, past the hermetic seal at the insulator/ferrule and insulator/terminal pin interfaces.

According to the invention, the terminal pin of a feedthrough assembly, and preferably of a feedthrough filter capacitor assembly, are composed of palladium. The terminal pin can be a uniform wire-type structure of palladium or an alloy thereof, or it can comprise an outer palladium coating over a core material. The core can be of platinum, tantalum, niobium or other electrically conductive materials commonly used in implantable medical devices. In that respect, palladium is an alternative corrosion resistant material that provides a considerably less expensive terminal pin than conventional platinum or platinum-iridium terminal pins while still achieving the same benefits of biocompatibility, good mechanical strength and a reliable hermetic feedthrough seal. Replacement of platinum and platinum-iridium terminal pins with a palladium-based material is done without employing complex and expensive manufacturing operations and, generally, without the addition of a secondary manufacturing process.

These and other objects and advantages of the present invention will become increasingly more apparent by a reading of the following description in conjunction with the appended drawings.

DETAILED DESCRIPTION OF THE PREFERRED EMBODIMENTS

Figure 1:
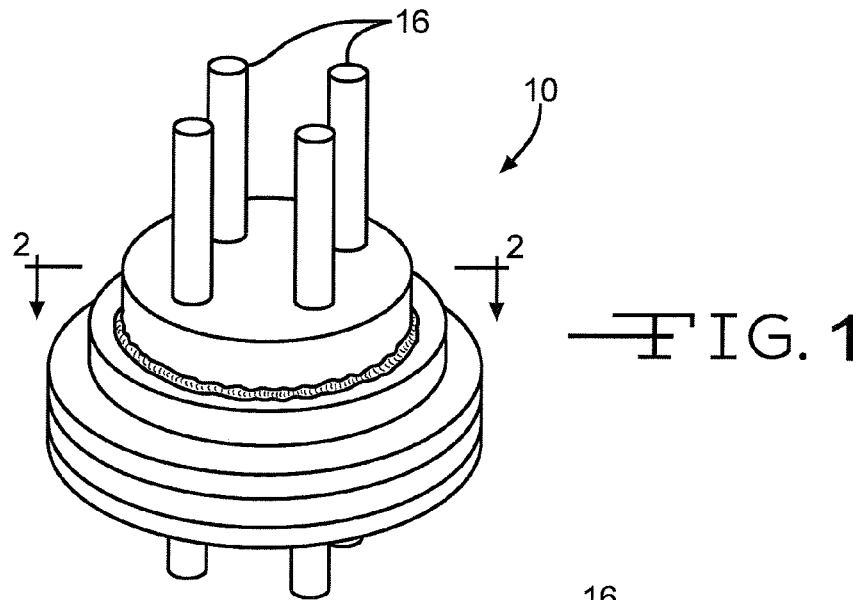
FIG. 1 is a perspective view of a feedthrough assembly embodying the novel features of the invention.
Figure 2:
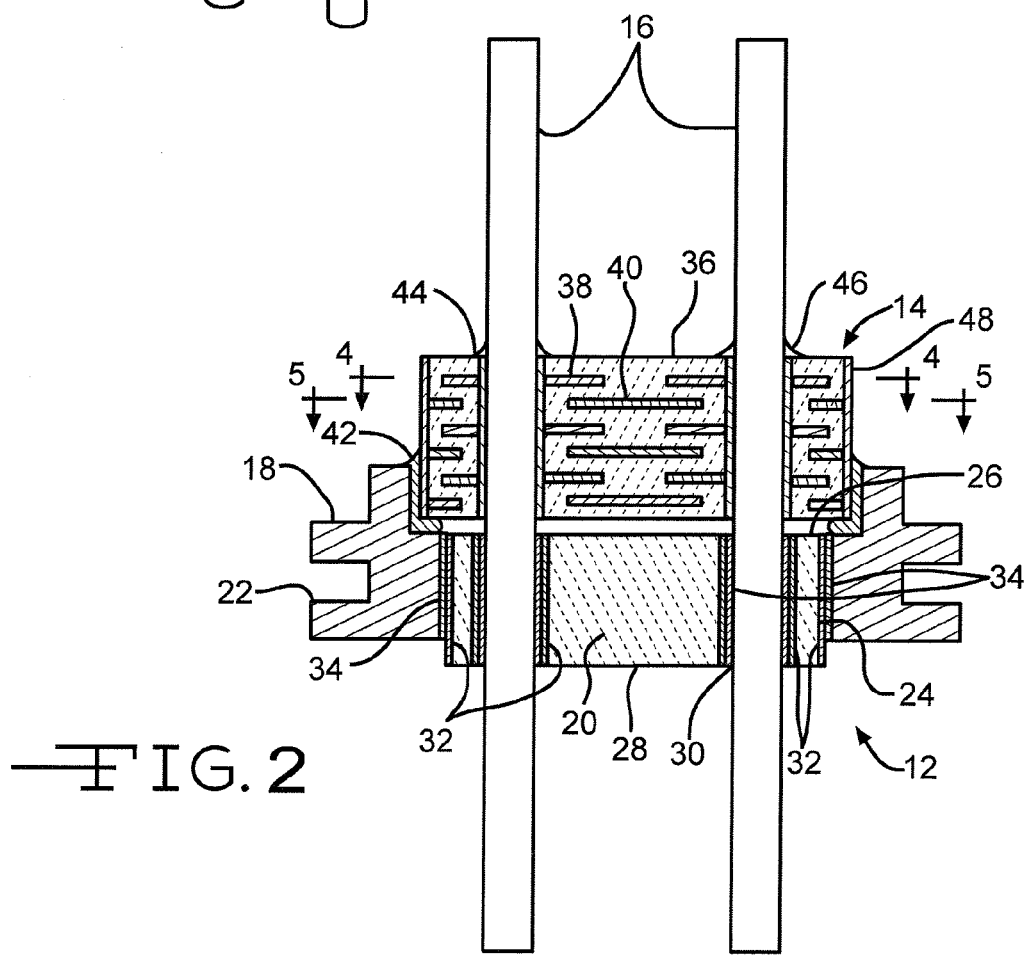
FIG. 2 is an enlarged sectional view taken along line 2-2 of FIG. 1.

Referring now to the drawings, FIGS. 1 and 2 show an internally grounded feedthrough capacitor assembly 10 comprising a feedthrough 12 supporting a filter discoidal capacitor 14. The feedthrough filter assembly 10 is useful with medical devices, preferably implantable devices such as pacemakers, cardiac defibrillators, cardioverter defibrillators, cochlear implants, neurostimulators, internal drug pumps, deep brain stimulators, hearing assist devices, incontinence devices, obesity treatment devices, Parkinson's disease therapy devices, bone growth stimulators, and the like. The feedthrough 12 portion of the assembly 10 includes terminal pins 16 that provide for coupling, transmitting and receiving electrical signals to and from a patient's heart, while hermetically sealing the interior of the medical instrument against ingress of patient body fluids that could otherwise disrupt instrument operation or cause instrument malfunction. While not necessary for accomplishing these functions, it is desirable to attach the filter capacitor 14 to the feedthrough 12 for suppressing or decoupling undesirable EMI signals and noise transmission into the interior of the medical device.

More particularly, the feedthrough 12 of the feedthrough filter capacitor assembly 10 comprises a ferrule 18 defining an insulator-receiving bore surrounding an insulator 20. Suitable electrically conductive materials for the ferrule 18 include titanium, tantalum, niobium, stainless steel or combinations of alloys thereof, the former being preferred. The ferrule 18 may be of any geometry, non-limiting examples being round, rectangle, and oblong. A surrounding flange 22 extends from the ferrule 18 to facilitate attachment of the feedthrough 10 to the casing (not shown) of, for example, one of the previously described implantable medical devices. The method of attachment may be by laser welding or other suitable methods.

The insulator 20 is of a ceramic material such as of alumina, zirconia, zirconia toughened alumina, aluminum nitride, boron nitride, silicon carbide, glass or combinations thereof. Preferably, the insulating material is alumina, which is highly purified aluminum oxide, and comprises a sidewall 24 extending to a first upper side 26 and a second lower side 28. The insulator 20 is also provided with bores 30 that receive the terminal pins 16 passing there through. A layer of metal 32, referred to as metallization, is applied to the insulator sidewall 24 and the sidewall of the terminal pin bores 30 to aid a braze material 34 in hermetically sealing between the ferrule 18 and the insulator 24 and between the terminal pins 16 and the insulator 24, respectively.

Suitable metallization materials 32 include titanium, titanium nitride, titanium carbide, iridium, iridium oxide, niobium, tantalum, tantalum oxide, ruthenium, ruthenium oxide, zirconium, gold, palladium, molybdenum, silver, platinum, copper, carbon, carbon nitride, and combinations thereof. The metallization layer may be applied by various means including, but not limited to, sputtering, electron-beam deposition, pulsed laser deposition, plating, electroless plating, chemical vapor deposition, vacuum evaporation, thick film application methods, and aerosol spray deposition, and thin cladding. Parylene, alumina, silicone, fluoropolymers, and mixtures thereof are also useful metallization materials.

Non-limiting examples of braze materials include gold, gold alloys, and silver. Then, if the feedthrough 10 is used where it will contact bodily fluids, the resulting brazes do not need to be covered with a biocompatible coating material. In other embodiments, if the brazes are not biocompatible, for example, if they contain copper, they are coated with a layer/coating of biocompatible/biostable material. Broadly, the biocompatibility requirement is met if contact of the braze/coating with body tissue and blood results in little or no immune response from the body, especially thrombogenicity (clotting) and encapsulation of the electrode with fibrotic tissue. The biostability requirement means that the braze/coating remains physically, electrically, and chemically constant and unchanged over the life of the patient.

According to one embodiment of the invention, the terminal pins 16 consist of palladium and its alloys. Non-limiting examples include pure palladium and alloys comprising from about 50% to about 99% palladium along with other elements including those from the platinum group such as ruthenium, rhenium, and iridium, or refractory metals such as molybdenum, and boron, and combinations thereof.

Mechanical properties of the terminal pin 16 can be tailored to a desired mechanical performance by adjusting the amounts of the elemental additions in the palladium alloy. For example, age hardening can be improved by increasing the amount of ruthenium. Other additions to the palladium alloy such as platinum, gold, copper, and zinc, for example increase the alloy's ability to be cold worked to achieve a higher tensile strength or to allow the alloy to be annealed and to increase its elongation characteristics.

Figure 3:
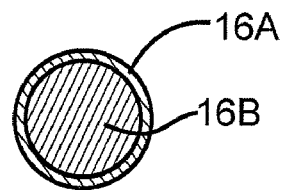
FIG. 3 is a cross-sectional view of one embodiment of a terminal pin 16 comprising an outer layer of palladium 16A coating an inner core 16B of electrically conductive material.

In another embodiment of the present invention, the terminal pins 16 comprise an exterior outer coating 16A of palladium and palladium alloys applied as a coating to a core 16B of a second, electrically conductive material other than palladium (FIG. 3). Preferably, the core material 16B is selected from the group consisting of niobium, tantalum, nickel-titanium (NITINOL®), titanium, particularly beta titanium, titanium alloys, stainless steel, molybdenum, tungsten, platinum, and combinations thereof. The means of coating may include sputtering, cladding, and or plating. The coating may be applied through a process of sputtering, electron-beam deposition, pulsed laser deposition, plating, electroless plating, chemical vapor deposition, vacuum evaporation, thick film application methods, aerosol spray deposition, and thin cladding.

For example, it is known that niobium readily oxidizes. This means that when it is used as a terminal pin material secondary operations are necessary in order to effect a hermetic braze with low equivalent series resistance (ESR). Providing a palladium outer coating 16A over a niobium core 16B in an evacuated atmosphere prior to formation of niobium oxide means that the thusly constructed terminal pin can be directly brazed into the insulator 20.

Although the terminal pin 16 is shown having a circular cross-section that is not necessary. The terminal pin 16 can have other cross-sectional shapes including square, triangular, rectangular, and hexagonal, among others. Nonetheless, the core 16B has a diameter of from about 0.002 inches to about 0.020 inches and the outer coating 16A has a thickness of from about 0.5μ inches to about 0.002 inches.

Up to now, terminal pins for feedthrough assemblies used in implantable medical devices, and the like, have generally consisted of platinum. However, replacement of platinum and platinum alloys by palladium and its alloys offers several advantages. For one, the density of platinum is 21.45 g/cc in comparison to palladium at 12.02 g/cc. Both of these materials are priced by weight, but used by volume. Therefore palladium has significant cost advantage over platinum. Secondly, palladium has comparable electrical conductivity to platinum (platinum=94.34 l/mohm-cm, palladium=94.8 l/mohm-cm and gold=446.4 l/mohm-cm). Thirdly, palladium and platinum have significantly eguivalent mechanical properties. After high temperature brazing, there is no significant degradation of mechanical properties such as strength and elongation. Fourthly, palladium is both solderable and weldable. Fifthly, palladium has good radiopacity characteristics. This is an important consideration for viewing the terminal pin during diagnostic scans such as fluoroscopy. Lastly, but every bit as important, palladium is biocompatible. Previous research indicates a variety of positive biocompatibility studies (both soft tissue and bone) for all elements used. Palladium and its alloy additives are regarded as chemically inactive.

Figure 4:
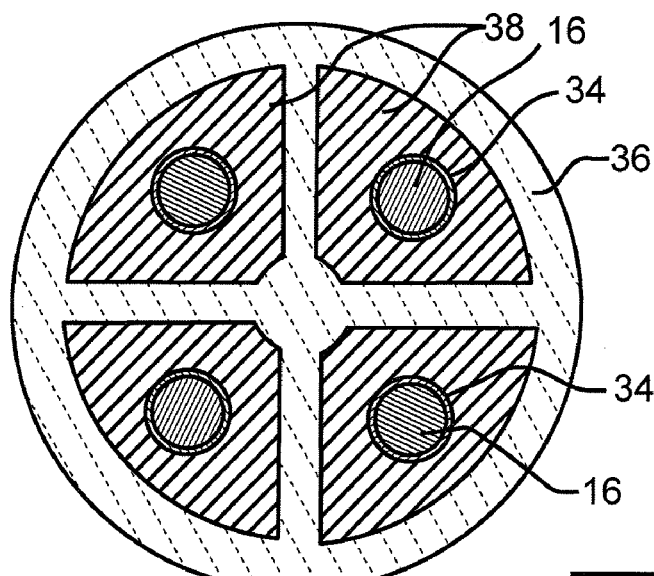
FIG. 4 is a cross-sectional view taken along line 4-4 of FIG. 2.
Figure 5:
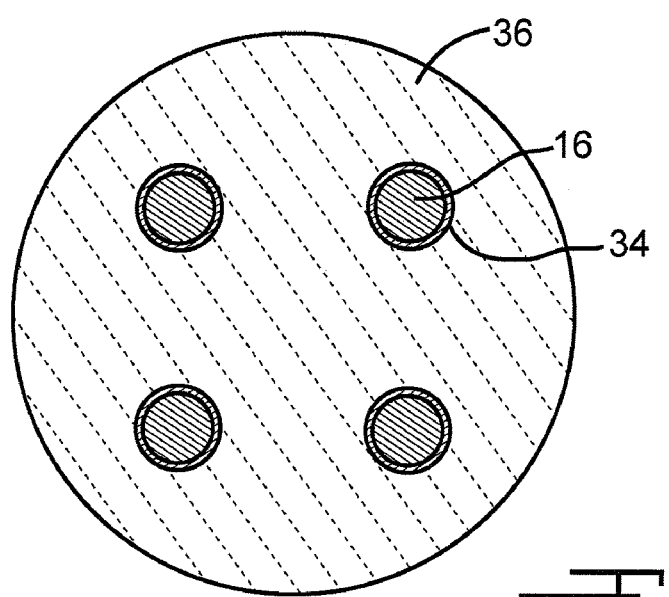
FIG. 5 is a cross-sectional view taken along line 5-5 of FIG. 2.

As further shown in FIGS. 2, 4 and 5, the feedthrough filter capacitor 10 includes the filter capacitor 14 that provides for filtering undesirable EMI signals before they can enter the device housing via the terminal pins 16. The filter capacitor 14 comprises a ceramic or ceramic-based dielectric monolith 36 having multiple capacitor-forming conductive electrode plates formed therein. The capacitor dielectric 36 preferably has a circular cross-section matching the cross-section of the ferrule 18 and supports a plurality of spaced-apart layers of first or "active" electrode plates 38 in spaced relationship with a plurality of spaced apart layers of second or "ground" electrode plates 40. The filter capacitor 14 is preferably joined to the feedthrough 12 adjacent to the insulator side 26 by an annular bead 42 of conductive material, such as a solder or braze ring, or a thermal-setting conductive adhesive, and the like. The dielectric 36 includes lead bores 44 provided with an inner surface metallization layer. The terminal pins 16 pass there through and are conductively coupled to the active plates 38 by a conductive braze material 46 contacting between the terminal pins 16 and the bore metallization. In a similar manner, the ground plates 40 are electrically connected through an outer surface metallization 48 and the conductive material 42 to the ferrule 18.

It is appreciated that various modifications to the invention concepts described herein may be apparent to those of ordinary skill in the art without departing from the scope of the present invention as defined by the appended claims.

What is claimed is:

1. A feedthrough assembly, which comprises:
   a) an insulator of electrically non-conductive material having a height defined by an insulator sidewall extending to a first insulator end and a second insulator end, wherein the insulator has at least one terminal pin bore extending from the first end to the second end thereof;
   b) a terminal pin received in the terminal pin bore, the terminal pin having a sidewall extending to opposed first and second ends disposed spaced from the respective first and second insulator ends, wherein the terminal pin comprises a terminal pin core of a first electrically conductive material other than palladium and an outer layer of palladium provided as a continuous coating supported on the terminal pin core;
   c) a ferrule of an electrically conductive material and comprising a ferrule opening defined by a surrounding sidewall extending to a first ferrule end and a second ferrule end, wherein the insulator is supported in the ferrule opening; and
   d) a first braze material contacting the palladium coating on the terminal pin core thereby hermetically sealing the terminal pin to the insulator and a second braze material hermetically sealing the insulator to the ferrule.

2. The feedthrough assembly of claim 1 wherein the first electrically conductive material of the terminal pin core is selected from the group consisting of niobium, tantalum, nickel-titanium, titanium, particularly beta titanium, titanium alloys, stainless steel, molybdenum, tungsten, platinum, and combinations thereof.

3. The feedthrough assembly of claim 1 wherein the terminal pin core has a diameter of from about 0.002 inches to about 0.020 inches.

4. The feedthrough assembly of claim 1 wherein the outer coating of palladium is of an alloy comprising from about 50% to about 99% palladium.

5. The feedthrough assembly of claim 4 wherein the palladium alloy includes at least one alloy material selected from the group consisting of ruthenium, rhenium, iridium, molybdenum, boron.

6. The feedthrough assembly of claim 1 wherein the palladium outer coating for the terminal pin has a thickness of from about 0.5µ inches to about 0.003 inches.

7. The feedthrough assembly of claim 1 wherein the terminal pin has a cross-sectional shape selected from the group consisting of circular, square, rectangular, and hexagonal.

8. The feedthrough assembly of claim 1 wherein the insulator is selected from the group consisting of alumina, zirconia, zirconia toughened alumina, aluminum nitride, boron nitride, silicon carbide, glass, and mixtures thereof.

9. The feedthrough assembly of claim 1 wherein the electrically conductive material of the ferrule is selected from the group consisting of titanium, tantalum, niobium, stainless steel, and combinations of alloys thereof.

10. The feedthrough assembly of claim 1 wherein the first and second braze materials are selected from the group consisting of gold, gold alloys, and silver.

11. The feedthrough assembly of claim 1 further including a metallization material covering the insulator sidewall and the terminal pin bore, the metallization material selected from the group consisting of titanium, titanium nitride, titanium carbide, iridium, iridium oxide, niobium, tantalum, tantalum oxide, ruthenium, ruthenium oxide, zirconium, gold, palladium, molybdenum, silver, platinum, copper, carbon, carbon nitride, and mixtures thereof.

12. A terminal pin for incorporation into a feedthrough, the terminal pin comprising:
   a) a terminal pin core of a first electrically conductive material other than palladium; and
   b) an outer layer of palladium provided as a continuous coating supported on the terminal pin core to a thickness such that the palladium is not completely diffused into the first electrically conductive material of the terminal pin core.

13. The terminal pin of claim 12 wherein first electrically conductive material of the terminal pin core is selected from the group consisting of niobium, tantalum, NITINOL, titanium, particularly beta titanium, titanium alloys, stainless steel, molybdenum, tungsten, platinum, and combinations thereof.

14. The terminal pin of claim 12 wherein the terminal pin core has a diameter of from about 0.002 inches to about 0.020 inches.

15. The terminal pin of claim 12 wherein the outer coating of palladium is of an alloy comprising from about 50% to about 99% palladium.

16. The terminal pin of claim 15 wherein the palladium alloy includes at least one alloy material selected from the group consisting of ruthenium, rhenium, iridium, molybdenum, boron.

17. The terminal pin of claim 12 wherein the palladium outer coating for the terminal pin has a thickness of from about 0.5µ inches to about 0.002 inches.

18. A method for providing a terminal pin for incorporation into a feedthrough assembly, comprising the steps of:
   a) providing a terminal pin core of a first electrically conductive material other than palladium; and
   b) coating the terminal pin core with an outer layer of palladium to a thickness such that the palladium is not completely diffused into the first electrically conductive material of the terminal pin core.

19. The method of claim 18 including coating the palladium layer over the terminal pin core using a process selected from the group consisting of sputtering, electron-beam deposition, pulsed laser deposition, plating, electroless plating, chemical vapor deposition, vacuum evaporation, thick film application methods, aerosol spray deposition, and thin cladding.

20. The method of claim 18 including selecting the first electrically conductive material of the terminal pin core from the group consisting of niobium, tantalum, nickel titanium, titanium, particularly beta titanium, titanium alloys, stainless steel, molybdenum, tungsten, platinum, and combinations thereof.

21. The method of claim 18 including providing the terminal pin core having a diameter of from about 0.002 inches to about 0.020 inches.

22. The method of claim 18 including providing the outer coating of palladium being of an alloy comprising from about 50% to about 99% palladium.

23. The method of claim 22 including providing the palladium alloy including at least one alloy material selected from the group consisting of ruthenium, rhenium, iridium, molybdenum, boron.

24. The method of claim 18 including providing the palladium outer coating for the terminal pin having a thickness of from about 0.5µ inches to about 0.003 inches.

* * * * *